(12) United States Patent
Willden et al.

(10) Patent No.: US 9,697,371 B1
(45) Date of Patent: Jul. 4, 2017

(54) REMOTE AUTHORIZATION OF USAGE OF PROTECTED DATA IN TRUSTED EXECUTION ENVIRONMENTS

(71) Applicant: Google Inc., Mountain View, CA (US)

(72) Inventors: Shawn Willden, Morgan, UT (US); Curtis Gerald Condra, San Jose, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 14/788,290

(22) Filed: Jun. 30, 2015

(51) Int. Cl.
| | | |
|---|---|---|
| G06F 21/00 | (2013.01) | |
| G06F 21/62 | (2013.01) | |
| H04L 29/06 | (2006.01) | |
| H04L 9/32 | (2006.01) | |
| H04L 9/08 | (2006.01) | |

(52) U.S. Cl.
CPC .......... G06F 21/62 (2013.01); H04L 9/0825 (2013.01); H04L 9/3242 (2013.01); H04L 63/0428 (2013.01); H04L 63/08 (2013.01); H04L 63/126 (2013.01)

(58) Field of Classification Search
CPC ... G06F 21/62; H04L 63/0428; H04L 9/0825; H04L 9/3242; H04L 63/08; H04L 63/126
USPC .......................................................... 713/171
See application file for complete search history.

(56) References Cited

U.S. PATENT DOCUMENTS

| | | | | |
|---|---|---|---|---|
| 8,037,538 B2* | 10/2011 | Baba | ...................... | H04L 9/3271 709/229 |
| 8,316,237 B1* | 11/2012 | Felsher | .................. | H04L 9/0825 380/282 |
| 9,419,841 B1* | 8/2016 | Kozolchyk | ............. | H04L 29/06 |
| 2002/0083178 A1* | 6/2002 | Brothers | .................. | G06F 21/10 709/226 |
| 2005/0081044 A1* | 4/2005 | Giles | ........................ | H04L 63/08 713/182 |
| 2008/0077794 A1* | 3/2008 | Arnold | ................... | H04L 9/0822 713/169 |
| 2008/0214300 A1* | 9/2008 | Williams | .............. | G06F 21/125 463/29 |
| 2010/0031021 A1* | 2/2010 | Arnold | ................... | H04L 9/0637 713/155 |
| 2011/0072274 A1* | 3/2011 | Leoutsarakos | ...... | H04L 63/0823 713/182 |

FOREIGN PATENT DOCUMENTS

| | | |
|---|---|---|
| EP | 2498529 A1 | 9/2012 |
| WO | 03079165 A2 | 9/2003 |
| WO | 2012120355 A1 | 9/2012 |
| WO | 2014025687 A2 | 2/2014 |

* cited by examiner

*Primary Examiner* — Mahfuzur Rahman
(74) *Attorney, Agent, or Firm* — Shumaker & Sieffert, P.A.

(57) ABSTRACT

A trusted execution environment (TEE) of a computing device may receive an operation request requiring use of a protected data accessible only to the TEE. Responsive to receiving the operation request, the TEE may generate first data. The computing device may send the first data to a remote computing device. Responsive to sending the first data, the TEE may receive second data. The TEE may validate the second data to verify the remote computing device generated the second data. Responsive to validating the second data was generated by the remote computing device, the TEE may perform the requested operation using the protected data.

17 Claims, 9 Drawing Sheets

REMOTE AUTHORIZATION OF USAGE OF PROTECTED DATA IN TRUSTED EXECUTION ENVIRONMENTS

BACKGROUND

Computing devices, whether mobile or not, are increasingly being used to interact with other computing devices to solve real world problems and distribute information. Information is valuable, particularly sensitive or confidential information such as trade secrets, usernames and passwords, banking information (e.g., credit card numbers), payment information, personal information (e.g., social security numbers), residential and commercial security codes, safety related information (e.g., information involved in the control of a self-driving car, information involved in the control of mass transit systems, etc.), and then some. For example, mobile banking provides certain conveniences such as allowing a user of such a service to handle certain banking needs without having to enter a physical branch location of the bank. As another example, mobile payment systems allow a user to pay for goods and services. As a result of these technologies and others, a computing device's storage, processing, and communication of information should be secure to maintain the confidentiality of certain information amongst the requisite parties, entities, devices, environments, and processes where appropriate.

SUMMARY

Computing devices such as servers may require devices in communication therewith to be authorized for certain operations. For example, in the context of mobile banking or mobile payment applications, a remote computing device (e.g., a server) may require another device (e.g., a mobile or non-mobile computing device) and possibly its user to be authorized for certain operations, such as fund transfers, deposits, or payments. In this example, one way to verify the mobile or non-mobile device is authorized for certain operations or transactions is to have the mobile or non-mobile device perform a cryptographic operation, such as generating a digital signature, using a secret (e.g., protected) cryptographic key, such as an asymmetric or symmetric key. A trusted execution environment (TEE) may be used as part of the security overlay or protocol to protect the confidentiality or usage of protected information, such as a cryptographic key.

In accordance with one or more techniques of this disclosure, a remote computing device may control, among other things, the rate and manner in which secret information (e.g., a secret key) may be used or otherwise accessed by the device. The disclosure teaches various other examples of ways to enhance security.

In one example, this disclosure describes a method comprising: receiving, by a TEE implemented by a computing device, an operation request requiring use of protected data accessible only to the TEE; responsive to receiving the operation request, generating, by the TEE, first data; sending, by the computing device, the first data to a remote computing device; responsive to sending the first data, receiving, by the TEE, second data only if a constraint on usage of the protected data is satisfied; validating, by the TEE, the second data to verify the remote computing device generated the second data; and responsive to validating the second data was generated by the remote computing device, performing an operation indicated by the operation request using the protected data.

In another example, this disclosure describes a method comprising: sending, by a first computing device, an operation request requiring use of protected data accessible only to a TEE implemented by a second computing device remote to the first computing device; responsive to sending the operation request, receiving, by the first computing device, first data generated by the second computing device; determining, by the first computing device, whether a constraint on usage of the protected data is satisfied; responsive to determining the constraint on usage of the protected data is satisfied, generating, by the first computing device, second data by encrypting a value calculated from the first data using a cryptographic key; and sending, by the first computing device, the second data to the second computing device, wherein the second computing device is configured to refrain from using the protected data unless the second computing device receives data calculated from the first data using the cryptographic key.

In another example, this disclosure describes a computing device comprising: one or more processors configured to: send an operation request requiring use of protected data accessible only to a TEE implemented by a remote computing device; receive, in response to sending the operation request, first data generated by the remote computing device; determine whether a constraint on usage of the protected data is satisfied; responsive to determining the constraint on usage of the protected data is satisfied: generate second data by encrypting a hash value calculated from the first data using a cryptographic key; and send the second data to the second computing device; and responsive to determining the constraint on the usage of the protected data is not satisfied, refrain from sending the second data to the second computing device, wherein the second computing device is configured to refrain from using the protected data unless the second computing device receives data calculated from the first data using the cryptographic key.

In another example, this disclosure describes a first computing device comprising one or more processors configured to: send an operation request requiring use of protected data accessible only to a TEE implemented by a second computing device remote to the first computing device; responsive to sending the operation request, receive first data generated by the second computing device; determine whether a constraint on usage of the protected data is satisfied; responsive to determining the constraint on usage of the protected data is satisfied, generate second data by encrypting a value calculated from the first data using a cryptographic key; and send the second data to the second computing device, wherein the second computing device is configured to refrain from using the protected data unless the second computing device receives data calculated from the first data using the cryptographic key.

In another example, this disclosure describes a computer readable storage medium having instructions stored there on that when executed configure a computing device to: send an operation request requiring use of protected data accessible only to a TEE implemented by a remote computing device; receive, in response to sending the operation request, first data generated by the remote computing device; determine whether a constraint on usage of the protected data is satisfied; responsive to determining the constraint on usage of the protected data is satisfied: generate second data by encrypting a hash value calculated from the first data using a cryptographic key; and send the second data to the second computing device; and responsive to determining the constraint on the usage of the protected data is not satisfied, refrain from sending the second data to the second computing device, wherein the second computing device is configured to refrain from using the protected data unless the second computing device receives data calculated from the first data using the cryptographic key.

In another example, this disclosure describes a computer readable storage medium having instructions stored there on that when executed configure a first computing device to: send an operation request requiring use of protected data accessible only to a TEE implemented by a second computing device remote to the first computing device; responsive to sending the operation request, receive first data generated by the second computing device; determine whether a constraint on usage of the protected data is satisfied; responsive to determining the constraint on usage of the protected data is satisfied, generate second data by encrypting a value calculated from the first data using a cryptographic key; and send the second data to the second computing device, wherein the second computing device is configured to refrain from using the protected data unless the second computing device receives data calculated from the first data using the cryptographic key.

The details of one or more examples are set forth in the accompanying drawings and the description below. Other features, objects, and advantages of the disclosure will be apparent from the description, drawings, and claims.

DETAILED DESCRIPTION

Figure 1:
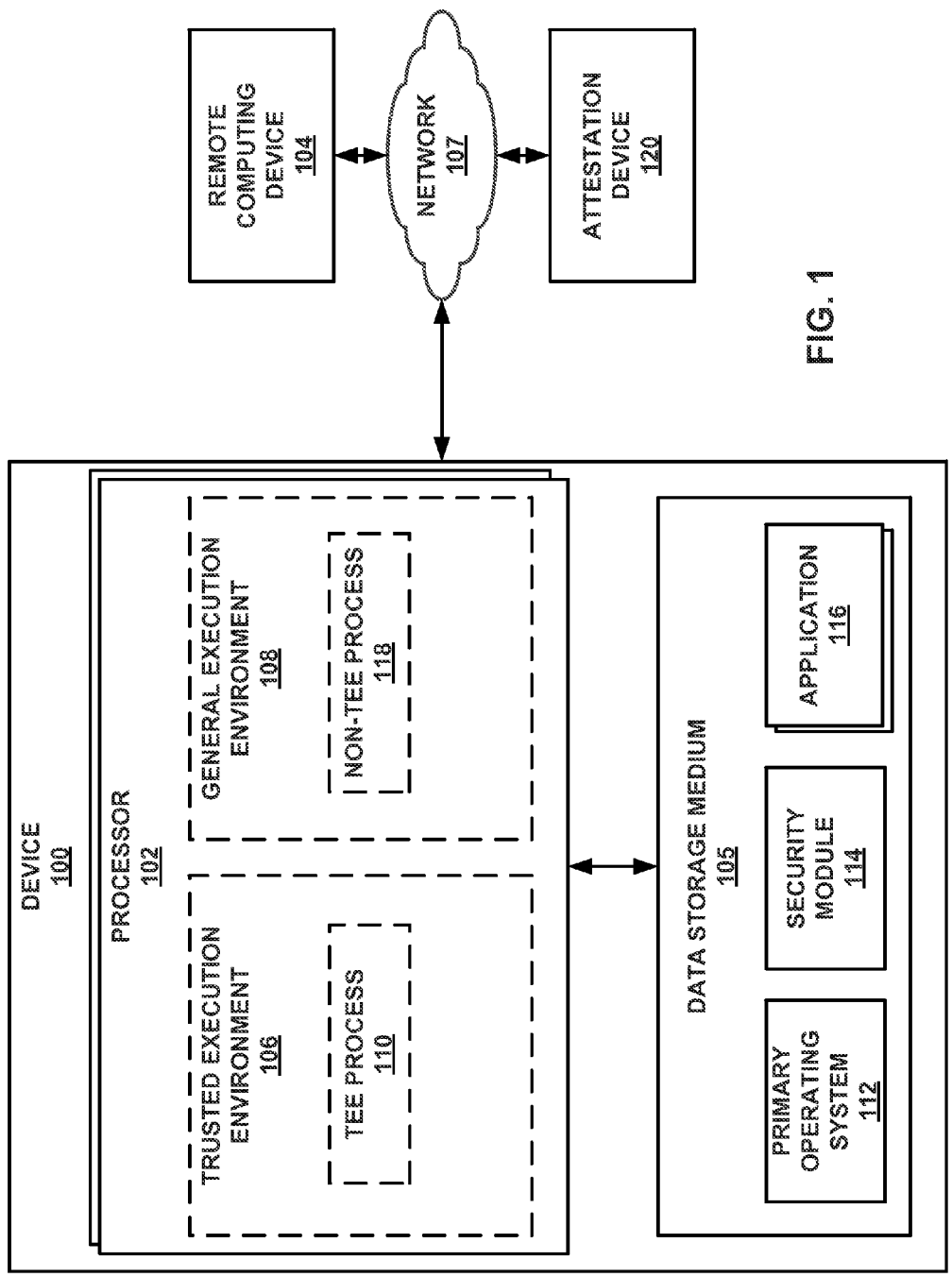
FIG. 1 is a conceptual diagram illustrating an example computing environment, in accordance with one or more techniques of this disclosure.

In general, this disclosure relates to one or more techniques that may increase information security in the context of computing devices. Computing devices such as servers may require devices in communication therewith to be authorized for certain operations. For example, a remote computing device (e.g., a server) may require another device (e.g., a mobile or non-mobile computing device) and possibly its user to be authorized for certain operations. One way to verify that the mobile or non-mobile device is authorized for certain operations or transactions is to have the mobile or non-mobile device perform a cryptographic operation, such as generating a digital signature, using a secret (e.g., protected) cryptographic key, such as an asymmetric or symmetric key. Discussion in this disclosure of a secret may apply to other types of protected data and discussion of protected data may apply to secrets. A trusted execution environment (TEE) may be used as part of the security overlay or protocol to protect the confidentiality or usage of protected information, such as a cryptographic key.

This disclosure describes various examples of systems, devices, methods, and computer-readable mediums that may combat attacks in which an attacker attempts to determine the secret by causing the TEE to perform a large number of cryptographic operations involving the secret. For instance, in accordance with one or more techniques of this disclosure, the TEE or device may be prevented from being used as an oracle that performs processes, operations, instructions, or the like at the request of a potential or actual attacker utilizing a remote computing device in communication with the device to enhance security. For example, the remote computing device may control, among other things, the rate and manner in which secret information (e.g., a secret key) may be used or otherwise accessed by the device or the TEE of the device. The disclosure teaches various other example ways to enhance security.

In accordance with one or more techniques of this disclosure, a device includes a processor configured to execute one or more processes in a trusted execution environment (TEE) implemented by the processor to protect data or processes. Generally, the TEE runs in conjunction with (e.g., in parallel with, with time-sharing, and the like) a general execution environment (GEE or non-TEE), but non-parallel applications involving the TEE and the GEE are also considered within the scope of this disclosure. Security is afforded by the TEE in a number of different ways. For example, isolation of the TEE from the GEE may be effectuated at the hardware and/or software level. The TEE may enable secure storage of data and the processing therefore. The TEE may enable secure execution of an application and the processes corresponding thereto. The TEE may have access to the same memory accessible to the GEE, whether on- or off-processor. The TEE may have access to memory inaccessible to the GEE, whether on- or off-processor.

FIG. 1 is a conceptual diagram illustrating an example computing environment, in accordance with one or more techniques of this disclosure. The computing environment shown in FIG. 1 includes a device 100, a remote computing device 104, an attestation device 120, and a network 107. Network 107 may facilitate communication between one or more of device 100, remote computing device 104, and attestation device 120. The network 107 may be a wired network, a wireless network, or a combination thereof. Other example computing environments may include more or fewer components. For instance, particular techniques of this disclosure may be implemented without network 107 and attestation device 120.

Device 100 may, in different examples, include various types of devices. For example, device 100 may include a mobile device. Example types of mobile devices include mobile phones, tablet computers, wearable computing devices, laptop computers, portable media players, portable game consoles, and other types of devices designed for portability. In other examples, device 100 includes a non-mobile computing device, a personal computer, a server computer, an intermediate network device, a home automation device (e.g., a network enabled appliance, door lock, lamp, home security device), network enabled sensor device, and so on.

In the example of FIG. 1, device 100 includes one or more processors represented as processor 102, and one or more data storage media represented as data storage medium 105. Likewise, remote computing device 104 and attestation device 120 may each also include one or more processors and one or more data storage media. Data storage medium 105 is communicatively coupled to the processor 102. Other example devices may include other components, such as multiple processors, data storage media, busses, interfaces, and so on. In some examples, processor 102 is implemented using one or more microprocessors. Processor 102 is configured to execute instructions to perform corresponding processes. Accordingly, as used herein, when a process is executed, that refers to executing one or more instructions or operations by a processor corresponding to that process. One or more processes may be or include one or more threads. In some examples, processor 102 includes a multi-core processor. In other examples, processor 102 is a single core (e.g., of a single core or multi-core processor).

Processor 102 implements a trusted execution environment (TEE) and a general execution environment (GEE), shown conceptually as elements 106 and 108 in FIG. 1 because, depending on the example, these environments may exist due to hardware isolation in the processor 102 or due to isolation of software executed by the processor 102. Additionally, while the processes depicted in TEE 106 and GEE 108 are conceptually shown as inside processor 102 and its respective environment, it is understood that these processes may be the result of instructions loaded from memory, such as data storage medium 105, for execution by the processor 102.

This disclosure may refer to processes executing in a TEE or processes configured to execute in the TEE as "TEE processes" (e.g., TEE process 110). One or more processes may also be executed outside of a TEE. This disclosure may refer to processes executing outside of the TEE or processes configured to execute outside of the TEE as "non-TEE processes" (e.g., non-TEE process 118). The hardware or software architecture of the processor isolates processes executed by the processor in the TEE from processes executed by the processor in the GEE outside the TEE. As noted above, as used herein, the term processor may refer to a single-core or multi-core processor. According to one example, each core in a multi-core processor may be configured to establish or otherwise provide a TEE and a GEE. In another example, a multi-core processor may be configured such that one or more cores are configured to establish or otherwise be used with a TEE, and one or more other cores are configured to establish or otherwise be used with a GEE. For example, one or more cores may be configured to execute TEE processes, and one or more other cores may be configured to execute non-TEE processes. These examples and other examples in this disclosure are non-limiting examples.

Processes executing in a TEE (i.e., processes executing in TEE) may have access to additional system resources that are unavailable to non-TEE processes (e.g., processes executing in a GEE). For example, regions of memory accessible to a processor can be marked as accessible only to a TEE or a GEE. This allows TEE processes to have both working memory and persistent storage inaccessible to non-TEE processes and vice versa. In some examples, TEE processes have access to "secure" modes of system peripherals. For example, a display and touch screen of a mobile device, or even regions thereof, can be placed in a secure mode and while in that mode, non-TEE processes cannot write to the display or receive input from the touch screen. The same concept may apply to many peripherals.

One or more of the TEE processes may cryptographically protect a secret to prevent use of the secret except by the one or more TEE processes. As used herein, the term "secret" encompasses, but is not limited to, protected information in the form of data. Accordingly, the term "secret" may be synonymous with "protected data" or "protected information" according to some examples. In other examples, the term "secret" may be a genus to underlying species such as protected information or data having different levels of secrecy or access rights associated therewith. In terms of access rights, such rights may be user-, device-, processor-, process-, or environment-driven.

In some examples, the secret (or protected information or data) is an encryption key associated with a cryptosystem. The encryption key may, for example, be a symmetric encryption key or an asymmetric encryption key. Regarding the latter, the encryption key may be a private encryption key in, for example, a public key exchange cryptosystem such as RSA or Diffie-Hellman. In other examples, a private key may be associated with other public key changes other than RSA or Diffie-Hellman or other cryptosystems entirely. In other examples, the secret (or protected information or data) may include a plurality of secrets or otherwise constitute a shared secret. For example, in examples of this disclosure using the Diffie-Hellman key exchange as but one example of a public key exchange, the secrets may include each private key associated with each participant in a particular exchange of information and the information itself subject to encryption.

As shown in the example of FIG. 1, one or more TEE processes 110 may execute in TEE 106. In some examples, TEE processes 110 may be or include threads. TEE processes 110 may include one or more processes that provide a specialized TEE operating system that manages operations of other ones of TEE processes 110. The TEE operating system may have significantly fewer capabilities than a typical operating system. Accordingly, TEE processes 110 whose operations are managed by a TEE operating system may be more constrained in their capabilities than typical processes whose operations are managed, for example, by a typical operating system in a GEE, such as primary operating system 112 and GEE 108, respectively.

Furthermore, TEE processes 110 may be unable to access data accessible to non-TEE processes, e.g., processes executing in general execution environment 108. For example, TEE processes 110 may be unable to access certain data, such as data originating from non-TEE processes. For instance, TEE processes 110 may be unable to access certain data originating from execution of primary operating system 112. However, TEE processes 110 may access data originating from TEE processes 110 and particular other trusted data sources, such as a clock of device 100. In some examples, any process executed in GEE 108 is a non-TEE process. Therefore, as depicted in FIG. 1, primary operating system 112 and security module 114 are examples of one or more non-TEE processes 118 executed in GEE 108. In other examples, additional non-TEE processes 118 are contemplated and are generally shown as one or more non-TEE processes 118.

Further yet, non-TEE processes 118 may be unable to access data accessible to TEE processes 110, e.g., processes executing in trusted execution environment 106. For example, non-TEE processes 118 may be unable to access certain data, such as data originating from TEE processes 110. For instance, non-TEE processes 118 may be unable to access certain data originating from execution of a TEE process 110. As another example, non-TEE processes 118 may be unable to access certain data that is only accessible to a TEE process 110 due to access restrictions implemented at the hardware or software level.

Processor 102 may execute a primary operating system 112, which may include one or more non-TEE processes, in GEE 108. In some examples, primary operating system 112 may be a typical operating system, such as a graphical-based operating system, found on a personal computing device such as a laptop computer, desktop computer, tablet computer, smart phone, or the like. Additionally, processors 102 may execute a security module 114, another example of a non-TEE process 118, in GEE 108. In some examples, security module 114 is part of primary operating system 112. In such examples, the techniques of this disclosure may be implemented at the operating system level so that each application does not need to implement its own solution for controlling use of a secret and the solutions are consistent for users. Furthermore, processor 102 may execute one or more applications 116 in TEE 106 or GEE 108 depending on the application security requirements. In some examples, primary operating system 112, security module 114, and one or more applications 116 may each include one or more non-TEE processes. In other examples, primary operating system 112, security module 114, and one or more applications 116 may each include one or more TEE processes. In yet other examples, primary operating system 112, security module 114, and one or more applications 116 may each include one or more non-TEE processes and one or more TEE processes.

Other processors of device 100 may or may not implement a trusted execution environment. Moreover, in some examples, the functions of primary operating system 112, security module 114, application 116, and/or other non-TEE processes may be performed on various processors of device 100. For instance, although this disclosure may refer to non-TEE processes executing on processor 102, such non-TEE processes may, in other examples, execute on other processors, e.g., other processors of device 100. For example, if TEE 106 and GEE 108 are hardware-isolated, these two environments may be on the same processor or on different processors depending on the extent to which the hardware-isolation is effectuated.

One or more applications 116 may include a wide variety of applications. For example, one or more applications 116 may include a banking application, a payment application, an application for controlling home automation devices, an application that accesses private data, and so on. In some examples, one or more applications 116 may include a third-party application, i.e., an application developed by a party other than a user of device 100 or a developer of primary operating system 112. Furthermore, in some examples, device 100 may download one or more applications 116, such as from an application store service or other content delivery service.

Security module 114 may enable a limited form of interaction between TEE processes 110 and non-TEE processes 118. In some examples, security module 114 implements an application programming interface (API) including one or more functions. Non-TEE applications, such as one or more applications 116 according to some examples, may invoke functions of the API to interact with TEE processes 110.

In accordance with one or more techniques of this disclosure, a non-TEE process 118 may request a TEE process 110 to cryptographically protect a secret to prevent use of the secret except by certain TEE processes 110. The secret may include various types of data. For example, the secret may include a symmetric or asymmetric encryption key, a nonce value, or other types of data. One or more TEE processes 110 may cryptographically protect the secret in various ways. For example, TEE 106 may have an encryption key accessible only by TEE processes 110 and not by non-TEE processes 118. In some instances, this encryption key is factory installed. For example, this encryption key may be installed in a memory accessible to processor 102, such as in data storage medium 105. In another example, a key generator application may be factory installed in a memory accessible to processor 102 (or, alternatively, may be downloaded by the device 100 if not factory installed) that, upon execution by processor 102, causes device 100 to acquire or otherwise generate such an encryption key. In such an example, the execution of the key generator application may cause device 100 to communicate with a remote computing device (e.g., a server or any computing device that is otherwise remote in relation to device 100 such as a non-server computing device operable in a peer-to-peer network configuration) over network 107 resulting in either an encryption key or key generation data being transferred over network 107 to device 100. In any of these examples, the encryption key may ultimately be stored in a memory accessible to processor 102, such as in data storage medium 105.

In this example (i.e., one in which an encryption key accessible only to TEE processes 110 stored on a memory accessible to processor 102), a TEE process 110 may encrypt the secret using the encryption key. Because the encryption key is only accessible to TEE processes 110, the encryption of the secret may prevent the use of the secret except by TEE processes 110, which can use the encryption key to decode the encrypted secret. For example, since the secret is encrypted, even if a non-TEE process 118 accessed the memory space in which the secret resided, such a read command would be unavailing to the entity attempting to access the secret absent the requisite information to decrypt the encrypted data, such as the encryption key accessible only to TEE processes 110. In a similar example, TEE 106 may have a private asymmetric encryption key and a public asymmetric encryption key. In this example, the private asymmetric encryption key is only accessible to TEE processes 110. In this example, a TEE process 110 may encrypt the secret using the public asymmetric encryption key. Because the private encryption key is only accessible to TEE processes 110, the encryption of the secret may prevent the use of the secret except by TEE processes 110, which can use the private asymmetric encryption key to decode the encrypted secret. TEE processes 110 may store the encrypted secret in data storage medium 105 or other memory accessible to processor 102.

In accordance with one or more techniques of this disclosure, TEE 106 or more broadly device 100 is prevented from being used as an oracle that performs processes, operations, instructions, or the like at the request of a potential or actual attacker using a remote computing device in communication with the device to enhance security. For example, an attacker may order device 100 or TEE 106 to perform many processes, operations, instructions, or the like using a secret (e.g., a cryptographic key). Through these many processes, operations, instructions, or the like, the attacker may be able to discover the secret (e.g., a cryptographic key). For example, through these many processes, operations, instructions, or the like, the attacker may generate many encrypted results that may be used to discover (or at least expedite the process associated therewith) the secret (e.g., a cryptographic key such as a private key or a symmetric key) used to generate the encrypted results. In some examples, to prevent device 100 from being used as oracle, remote computing device 104 may control, among other things, the rate and manner in which the secret (e.g., a cryptographic key) is used by the device. The disclosure teaches various other examples of ways to enhance security.

Figure 2:
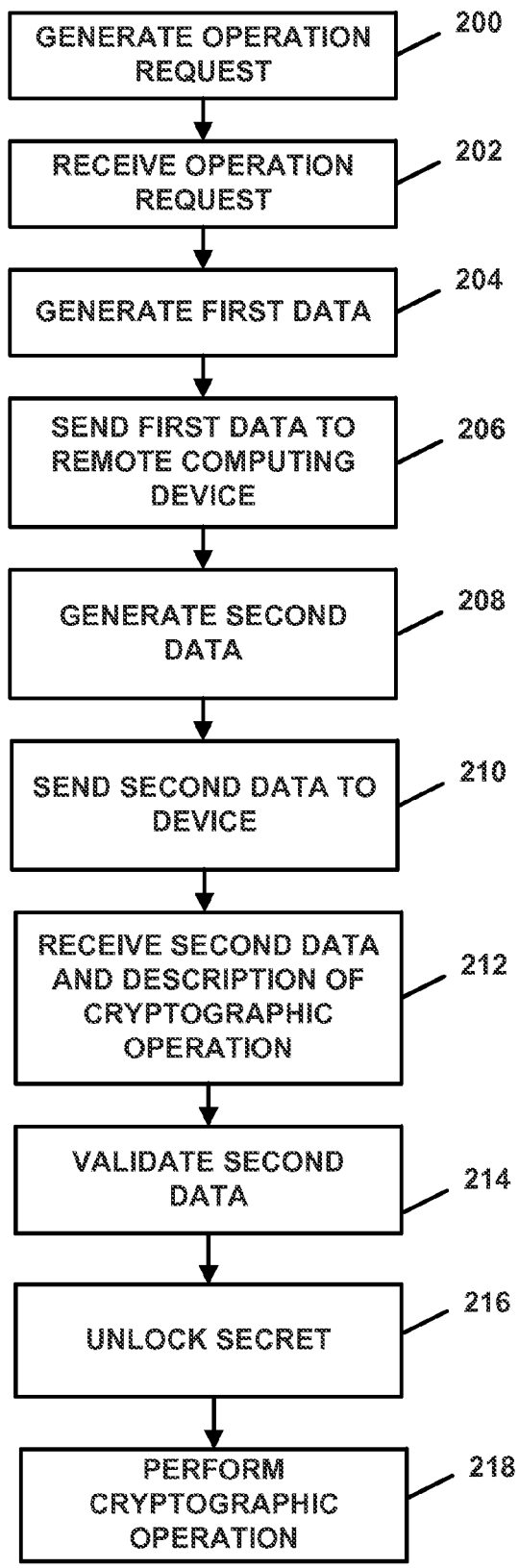
FIG. 2 is a flowchart illustrating an example operation of certain aspects of the computing environment shown in FIG. 1, in accordance with one or more techniques of this disclosure.

In another example, device 100 is programmed or otherwise configured to refuse to perform any operations, instructions, processes, or the like using a cryptographic key unless authorized by the remote computing device 104. Otherwise stated, device 100 is configured to only allow operations, instructions, processes, or the like to be performed using a cryptographic key when authorized by remote computing device 104. In this example, processor 102 may be configured as such, which may include instructions stored in data storage medium 105 that, when executed, causes such functionality to occur in, for example, TEE 106. The authorization may take the form of a cryptographic signature including, for example, a digital signature. In some examples, device 100 and remote computing device 104 may engage in a challenge-response protocol for device 100 to obtain the requisite authorization data (e.g., data representative of "authorized" or "unauthorized"). One example of a challenge-response protocol is depicted in FIG. 2. In accordance with one or more techniques of this disclosure, access control of a cryptographic key stored on a memory accessible to device 100 (e.g., data storage medium 105) is provided by a device external to device 100, such as remote computing device 104. In some examples, the challenge-response process involves remote computing device 104 providing a challenge (e.g., a challenge value such as a unique piece of data or nonce value) per-transaction on which device 100 operates to provide a valid response (i.e., valid answer) to the extent it is able to validate that remote computing device 104 provided the challenge.

While remote computing device 104 is described herein as being remote to, for example, device 100 and attestation device 120, it is understood that device 100 also constitutes a remote computing device to or with respect, for example, remote computing device 104 and attestation device 120.

FIG. 2 is a flowchart illustrating an example operation of certain aspects of the computing environment shown in FIG. 1, in accordance with one or more techniques of this disclosure. The flowcharts of this disclosure are provided as examples. Other examples in accordance with the techniques of this disclosure may include more, fewer, or different actions. Moreover, other examples in accordance with the techniques of this disclosure may perform the actions in different orders and/or may perform particular actions in parallel.

In the example shown in FIG. 2, remote computing device 104 generates (200) an operation request to device 100 in response to a triggering event. For example, the triggering event may include remote computing device 104 itself receiving a request, which to fulfill or attempt to fulfill may require the involvement of device 100. Device 100 receives (202) the operation request issued by remote computing device 104. Here, device 100 may process the request within TEE 106 using processor 102. Furthermore, processor 102 generates (204) first data, which may be characterized as a challenge or challenge data. Here, device 100 may generate the first data within TEE 106 using processor 102. Device 100 sends (206) or otherwise transmits the first data to remote computing device 104. Having received the first data, remote computing device 104 generates (208) second data. In some examples, generating the second data includes remote computing device 104 signing the first data with a cryptographic key, such as an asymmetric or symmetric cryptographic key according to some examples. This may be referred to as cryptographically or digitally signing the first data resulting in the second data. The second data may be an encrypted value (e.g., encrypted hash value) corresponding to the first data based on a hashing algorithm. Otherwise stated, to generate the second data, remote computing device 104 may calculate a hash value of the first data using a hashing algorithm. The remote computing device 104 may then encrypt the hash value corresponding to the first data to generate the second data (e.g., an encrypted hash value corresponding to the first data according to some examples).

In other examples, generating the second data includes something different than cryptographically signing the first data. In such examples, remote computing device 104 may simply generate second data including, for example, a password or other value that is used by device 100. Device 100 may use the second data to verify that remote computing device 104 (as opposed to some untrusted other device or process) generated the second data, which may also serve to authenticate remote computing device 104. Such examples may be referred to as forms of cryptographic authentication just as cryptographic signing is a form of cryptographic authentication.

Remote computing device 104 sends (210) or otherwise transmits the second data to device 100. Here, remote computing device 104 may also send to device 100 a description of the operation remote computing device 104 wants performed by device 100. In some examples, the description of the operation is a description of a cryptographic operation. Device 100 receives (212) the second data. In some examples, device 100 may also receive a description of the operation remote computing device 104 wants performed by device 100. Here, device 100 may process the information received from remote computing device 104 within TEE 106 using processor 102.

Device 100 validates (214) the second data to verify that remote computing device 104 generated the second data. In some examples, verifying that remote computing device 104 generated the second data serves to authenticate remote computing device 104 (e.g., serves to determine that remote computing device 104 is a trustworthy source). At action 214, device 100 may perform validation within TEE 106 using processor 102.

In examples where the second data includes a cryptographic signature of the first data, device 100 decrypts the second data with a cryptographic key resulting in a decrypted hash value corresponding to the first data. Device 100 may then compare this hash value to a hash value of the first data calculated by device 100. In such examples, if the decrypted hash value matches the calculated hash value, device 100 validates the second data. For example, if the first data was cryptographically signed (e.g., digitally signed) using an asymmetric cryptosystem, the first data may have been signed resulting in second data (e.g., a hash value corresponding to the first data based on a hashing algorithm) being generated followed by the second data being encrypted using a public key meaning that at action 214 the second data is decrypted using a private key corresponding to the public key. As another example, if the first data was cryptographically signed (e.g., digitally signed) using an asymmetric cryptosystem, the first data may have been signed resulting in second data (e.g., a hash value corresponding to the first data based on a hashing algorithm) being generated followed by the second data being encrypted using a private key meaning that at action 214 the second data is decrypted using a public key corresponding to the private key. As yet another example, if the first data was cryptographically signed (e.g., digitally signed) using a symmetric cryptosystem, the first data may have been signed resulting in second data (e.g., a hash value corresponding to the first data based on a hashing algorithm) being generated followed by the second data being encrypted using a cryptographic key meaning that at action 214 the second data is decrypted using the same cryptographic key. Successful decryption of the second data by device 100 may serve to verify that remote computing device 104 generated the second data or otherwise verify the authenticity of the message or sender. Likewise, if the second data includes a password or value other than a cryptographic signature, validation of the second data may occur when device 100 determines that the password or value is acceptable or otherwise correct. In yet other examples, the validation (e.g., decryption) of the second data results in third data being derived with the third data including, for example, a validation or authentication result.

In some examples, additional validation or authentication may be incorporated into the process at, for example, between actions 214 and 216 or elsewhere providing another hurdle for a would-be attacker. For example, user authentication may be incorporated into the process so that device 100 (or TEE 106) may require that both remote computing device 104 and an authorized user of device 100 authorize usage of a secret. Device 100 (or TEE 106) may be configured to perform before, after, or in parallel user authentication via a user authentication protocol, such as a password-based protocol or a biometric protocol (e.g., fingerprint scan or retina scan).

Successful validation (e.g., verifying that the second data was in fact generated by remote computing device 104) results in device 100 unlocking (216) or rendering accessible for use or processing of a secret. In some examples, the secret may be a cryptographic key, which may be part of an asymmetric or symmetric cryptosystem. In other examples, the secret may be information that is not a cryptographic key. Whether the secret is a cryptographic key or not, the secret may only be accessible to processes executing in TEE 106 of processor 102.

Device 100 performs (218) an operation using the unlocked secret. This operation (or operations) may only be able to be performed in TEE 106 of processor 102. In some examples, the operation performed is a cryptographic operation such as an encryption or decryption operation using the unlocked secret. In these examples, using the unlocked secret may refer to the unlocked secret (or plainly, secret) being a cryptographic key that is used to encrypt or decrypt data. Also in these examples, using the unlocked secret may refer to the unlocked secret being information (i.e., data) on which encryption or decryption is performed. The operation performed at action 218 may be an operation corresponding to a description of an operation received by device 100 that was transmitted by remote computing device 104. Otherwise stated, the operation performed at action 218 may be an operation that remote computing device 104 requested be performed by device 100.

In accordance with one or more techniques of this disclosure, device 100 is configured to securely manage secrets. For example, TEE 106 may be configured to securely manage secrets. Additionally, a secret stored on device 100 may have constraints on its usage and access. TEE 106 may impose and enforce such constraints according to some examples whereas according to other examples, remote computing device 104 may impose and enforce such constraints.

As one example, at action 200 in FIG. 2, remote computing device 104 may determine whether to issue an operation request to device 100 based on a constraint concerning the number of operation requests sent to device 100. In this way, remote computing device 104 may throttle requests and protect device 100 from being inundated with too many requests and can therefore prevent device-harassment and thwart attack efforts. For example, there may be a maximum number of requests allowed to be sent to device 100 within a certain time period and remote computing device 104 may be configured to enforce such a constraint. As another example, remote computing device 104 may determine whether to issue an operation request to device 100 based on a constraint concerning the time of day. In this way, remote computing device 104 may throttle requests at times known for attack or otherwise.

As another example, at action 204, device 100 may be configured to not generate first data in response based on a constraint concerning the number of operation requests received by device 100. In this way, device 100 may throttle first data generation and protect device 100 from using up its resources in responding operation requests and can therefore prevent device-harassment and thwart attack efforts. For example, there may be a maximum number of requests allowed to be received by device 100 within a certain time period and device 100 may be configured to enforce such a constraint by making the requisite determination. As another example, such a determination may be made based on a constraint concerning the time of day. Other examples of constraints that may be used to limit the usage or access of a secret may likewise be implemented at actions 200, 204, or other actions depicted in FIG. 2.

In accordance with one or more techniques of this disclosure, device 100 may be configured to determine the cryptographic key that remote computing device 104 may use to cryptographically sign data. For example, remote computing device 104 may specify to device 100 the particular key used for a particular cryptographic signature such that the appropriate secret may be unlocked.

Referring back to FIG. 1, in accordance with one or more techniques of this disclosure, the environment depicted may include an attestation device 120. In some examples, attestation device 120 may be or otherwise include a computing device remote to device 100. Attestation device 120 may enable attestation of possession of a secret and any restrictions (e.g., constraints) that may be enforced on its access or usage. As used herein, accessing a secret is a type of usage of the secret.

Attestation device 120 may enable TEE 106 (or device 100) to securely attest to its possession of a secret and, in some instances, any restrictions that may be enforced on its access or usage. Attesting to its possession of a secret may include examples where the TEE attests that the TEE has access to the secret (e.g., the secret is stored in memory space accessible to the TEE). According to some examples, a device-specific secret (e.g., a device-specific private cryptographic key) may be installed on device 100 during manufacturing, which may be referred to as factory installed. According to other examples, a secret generator application may be factory installed in a memory accessible to processor 102 (or, alternatively, may be downloaded by device 100 if not factory installed) that, upon execution by processor 102, causes device 100 to acquire or otherwise generate a device-specific secret such a private cryptographic key. In such an example, the execution of the secret generator application may cause device 100 to communicate with a remote computing device 104 over network 107 resulting in either a secret or secret generation data being transferred over network 107 to device 100. In any of these examples, the secret may ultimately be stored in a memory accessible to processor 102, such as in data storage medium 105. Additionally, in any of these examples, the secret may be only accessible with TEE 106; and, therefore, the secret may be characterized as being injected into TEE 106 (or each device 100) during device manufacturer or later installment.

To enable TEE 106 (or device 100) to securely attest to its possession of a secret and, in some instances, any restrictions that may be enforced on its access or usage, attestation device 120 may possess each secret to which TEE 106 (or device 100) may attest its possession. For example, one or more secrets capable of being unlocked through the process described with reference to FIG. 2 may also be stored in a memory accessible to a processor on attestation device 120, such as a data storage medium on the attestation device.

Figure 3:
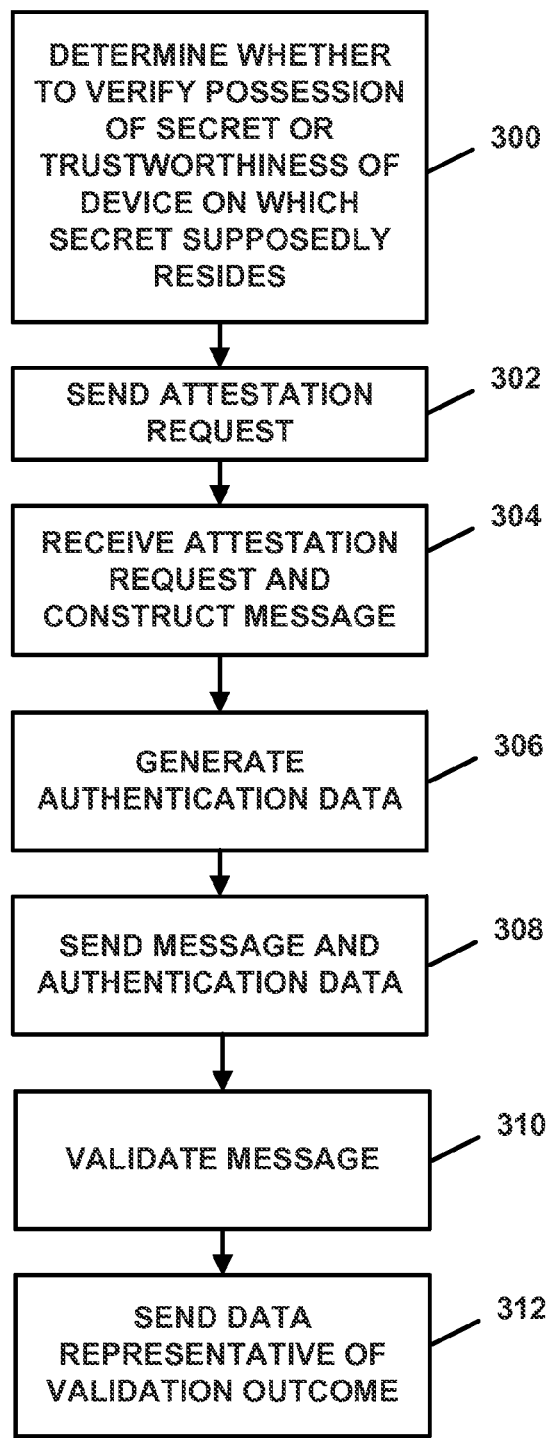
FIG. 3 is a flowchart illustrating an example operation of certain aspects of the computing environment shown in FIG. 1, in accordance with one or more techniques of this disclosure.

FIG. 3 is a flowchart illustrating an example operation of certain aspects of the computing environment shown in FIG. 1, in accordance with one or more techniques of this disclosure. In the example shown in FIG. 3, remote computing device 104 may determine (300) whether to verify that a secret supposedly stored in memory accessible to device 100 that remote computing device 104 has requested or will request be unlocked (e.g., via an operation request sent to device 100) is in fact stored in memory accessible to device 100. In another example, remote computing device 104 may determine whether to verify that a device (e.g., device 100) or environment (e.g., TEE 106) it is ultimately in communication with is a trustworthy device or environment. Upon making either of these determinations, remote computing device 104 may send (302) an attestation request to device 100. The attestation request may be sent to TEE 106.

Device 100 (or TEE 106) receives (304) the attestation request, and in response, constructs or otherwise generates a message that may contain public data associated with a secret that remote computing device 104 seeks to verify is in fact available on device 100. For example, the public data may be a public key corresponding to a private key where the secret is the private key. In addition to the message containing public data associated with a secret sought to be attested, the message may also be constructed to contain a description of the authorization required to use the secret. The message may include data indicative of whether the secret is stored in memory accessible to device 100 (or TEE 106). Device 100 (or TEE 106) generates (306) authentication data for the constructed message by, for example, cryptographically signing the message with the device-specific secret. In examples involving a cryptographic signage of data, the resultant authentication data may be referred to as a cryptographic signature. For example, the authentication data may be an encrypted hash value corresponding to the message data based on a hashing algorithm. Otherwise stated, to generate the authentication data, device 100 (or TEE 106) may calculate a hash value of the message using a hashing algorithm. The device 100 (or TEE 106) may then encrypt the hash value corresponding to the message to generate the authentication data (e.g., an encrypted hash value corresponding to the message according to some examples).

Device 100 (or TEE 106) sends (308) or otherwise transmits the message and authentication data. In some examples, device 100 may transmit the message and authentication data to attestation device 120. In other examples, the message and authentication data are transmitted to remote computing device 104, which then forwards the message and authentication data to attestation device 120. In such examples, device 100 may be ignorant or agnostic to the presence of attestation device 120 in the system to enhance security. In such examples, device 100 may not have any information stored thereon that could identify attestation device 120 or the existence thereof. Security may be enhanced in such examples because a would-be attacker may be unaware of the attestation process. Security may also be enhanced in such examples because the attestation process described in FIG. 3 may not be allowed to take place in the event that the device-constructed message is received by attestation device 120 from an entity other than remote computing device 104. Otherwise stated, the attestation process described in FIG. 3 may only be allowed to take place in the event that the device-constructed message is received by attestation device 120 from remote computing device 104.

Additionally, by using remote computing device 104 as a forwarding service, remote computing device 104 may be configured to process the information received from device 100 in response to its attestation request before forwarding the information to attestation device 120. For example, remote computing device 104 may be configured to determine whether information received from device 100 includes authentication data. If not, remote computing device 104 may make an appropriate decision For example, remote computing device 104 may determine that device 100 is not to be trusted and, in response, discontinue the attestation process and, in some examples, any corresponding operation request. As another example, remote computing device 104 may determine that device 100 may not be trustworthy but re-initiate the attestation process one or more times before hitting a threshold count in an attempt to rectify the error (e.g., no authentication data) before discontinuing the attestation process and, in some examples, any corresponding operation request.

Attestation device 120 uses its copy of the device-specific secret to validate (310) the authentication data to verify that device 100 (or TEE 106) generated the authentication data. In some examples, verifying that device 100 (or TEE 106) generated the authentication data serves to authenticate device 100 (or TEE 106) as, for example, a trustworthy source or serves to authenticate that the message with which the authentication data is associated (e.g., came from a trustworthy source such as a trustworthy device or trustworthy TEE). As one example, attestation device 120 may use it copy of the device-specific secret to decrypt the authentication data resulting in a decrypted hash value corresponding to the message. Attestation device 120 then compare this hash value to a hash value of the message calculated by attestation device 120. In such examples, if the decrypted hash value matches the calculated hash value, attestation device 120 validates the authentication data.

Depending on the outcome of the validation process at action 310, attestation device 120 sends (312) or otherwise transmits data to remote computing device 104 representative of any validation result(s). For example, a validation result may indicate a positive or negative validation. A positive validation may indicate that the authentication data, and therefore the message associated therewith (e.g., the message sent along with the authentication data), were generated by device 100 (or TEE 106). A negative authentication may indicate the opposite is true. Additionally, a positive authentication may indicate that TEE 106 (or device 100) has in its possession (e.g., on memory accessible to the device) the secret and, in some instances, any restrictions that may be enforced on the access or usage of the secret. A negative authentication may indicate the opposite is true.

Figure 4A:
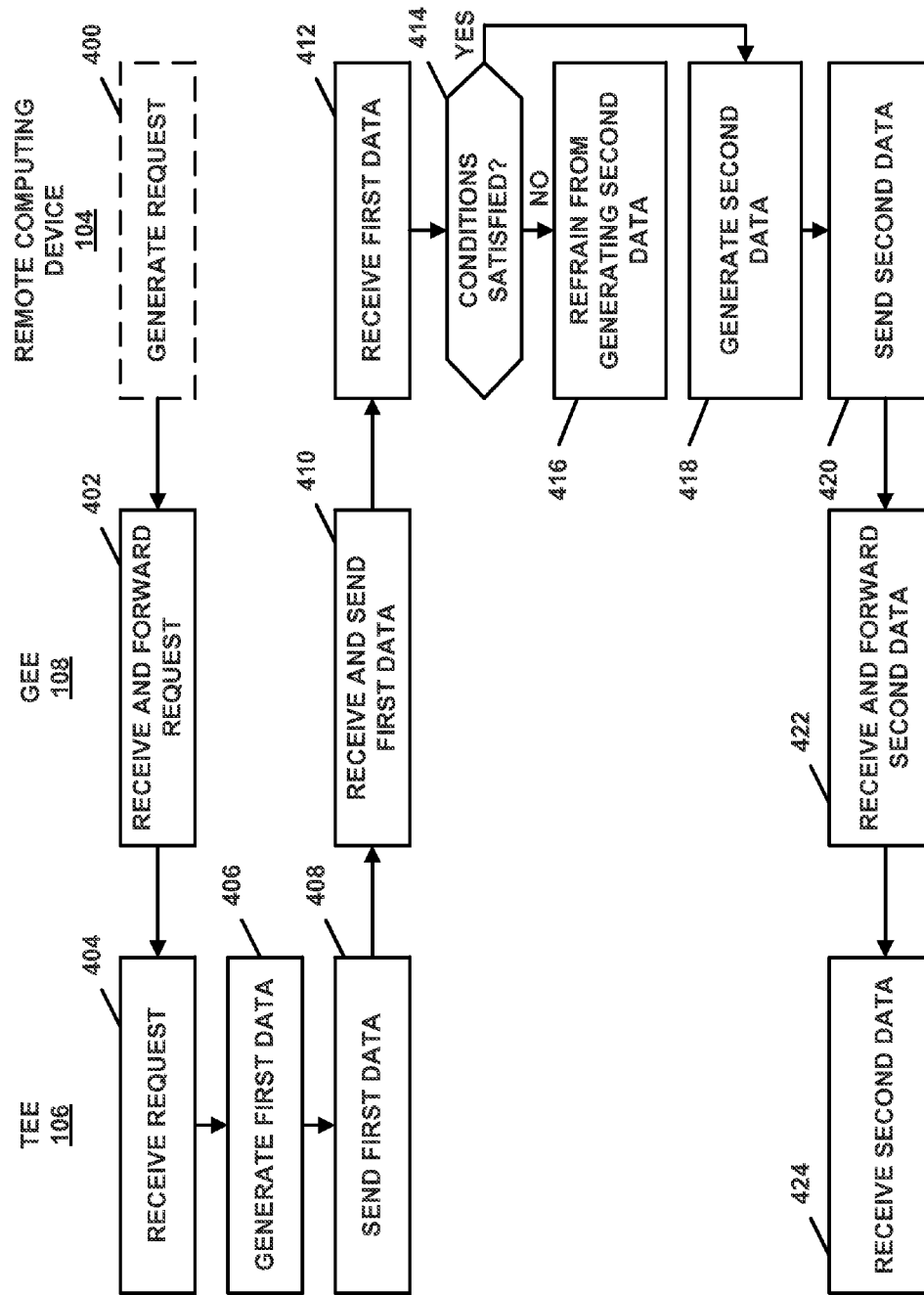
FIG. 4A is a flowchart illustrating an example operation of certain aspects of the computing environment shown in FIG. 1, in accordance with one or more techniques of this disclosure.
Figure 4B:
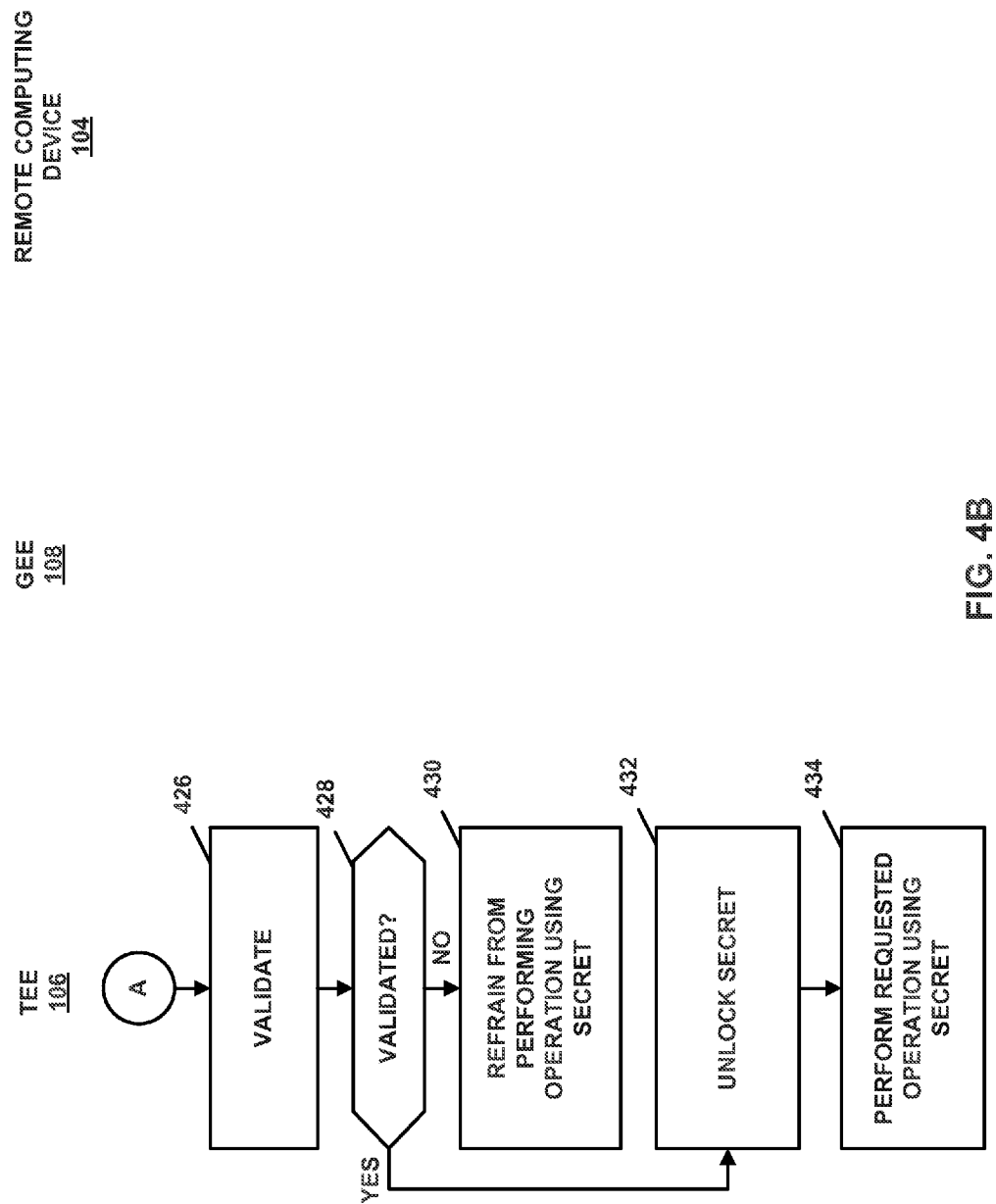
FIG. 4B is a flowchart illustrating a continuation of the example operation depicted in FIG. 4A, in accordance with one or more techniques of this disclosure.

FIGS. 4A-4B constitute a flowchart illustrating an example operation of certain aspects of the computing environment shown in FIG. 1, in accordance with one or more techniques of this disclosure. More specifically, FIGS. 4A-B constitute a flowchart illustrating an example operation between device 100 (and TEE 106 and GEE 108) and remote computing device 104 that may incorporate one or more features described herein. For example, according to some examples, FIGS. 4A-4B may be considered an expanded version of FIGS. 2 and 3. Processes shown under the TEE 106 label constitute TEE processes 110 and processes shown under the GEE 108 label constitute non-TEE processes. processes 118.

Referring to FIG. 4A, remote computing device 104 generates (400) an operation request to device 100 in response to a triggering event. For example, the triggering event may include remote computing device 104 itself receiving a request, which to fulfill or attempt to fulfill may require the involvement of device 100. GEE 108 of device 100 receives (402) the operation request issued by remote computing device 104. Here, GEE 108 may analyze the operation request and determine that it should be forwarded to TEE 106 of device 100. For example, GEE 108 may analyze data in a packet header associated with the transmission of the operation request to determine that the request came from remote computing device 104. As one example, a packet header may include the source IP (Internet Protocol) address to the extent IP is used to communicate the operation request. In other examples, device 100 may be configured to send the operation request received from remote computing device 104 directly to TEE 106 instead of using GEE 108 to forward the request to TEE 106.

TEE 106 of device 100 receives (404) the operation request issued by remote computing device 104 that was forwarded to TEE 106 by GEE 108 for processing. Processor 102 generates (406) first data that may be characterized as a challenge or challenge data. Here, device 100 generates the first data within TEE 106 using processor 102. TEE 106 sends (408) the first data to GEE 108 that in turn may cause the first data to be sent (410) by device 100 to remote computing device 104. In other examples, TEE 106 may cause the first data to be transmitted by device 100 to remote computing device 104 without involving GEE 108.

Having received the first data at action 412, remote computing device 104 may determine (414) whether a condition or constraint is satisfied to determine whether second data should be generated. For example, some conditions may limit the number of times device 100 may send first data to remote computing device 104 before the remote computing device disregards such first data. Some conditions may limit when second data generation is even available based on, for example, time of day, whether the user of the device 100 has been authenticated, and the like. If one or more conditions are not satisfied ("NO" branch of 414), remote computing device 104 may refrain (416) from generating second data. However, if the requisite conditions are satisfied (e.g., all conditions according to some examples or a subset of conditions according to other examples) ("YES" branch of 414), remote computing device 104 generates (418) second data. In some examples, generating the second data includes remote computing device 104 signing the first data with a cryptographic key, such as an asymmetric or symmetric cryptographic key according to some examples. This may be referred to as cryptographically or digitally signing the first data resulting in the second data. The second data may be an encrypted hash value corresponding to the first data based on a hashing algorithm. Otherwise stated, to generate the second data, remote computing device 104 may calculate a hash value of the first data using a hashing algorithm. The remote computing device 104 may then encrypt the hash value corresponding to the first data to generate the second data (i.e., an encrypted hash value corresponding to the first data according to some examples).

In other examples, generating second data includes something different than cryptographically signing the first data. In such examples, remote computing device 104 may simply generate second data including, for example, a password or other value that is used by device 100 to authenticate remote computing device 104. Such examples may be referred to as forms of cryptographic authentication just as cryptographic signing is a form of cryptographic authentication.

Remote computing device 104 sends (420) or otherwise transmits the second data to device 100. Here, remote computing device 104 may also send to device 100 a description of the operation remote computing device 104 wants performed by TEE 106. In some examples, the description of the operation is a description of a cryptographic operation.

GEE 108 receives (422) the second data generated and transmitted by remote computing device 104. Here, GEE 108 may analyze the second data and determine that it should be forwarded to TEE 106 of device 100. For example, GEE 108 may analyze data in a packet header associated with the transmission of the second data to determine that the second data came from remote computing device 104. As one example, a packet header may include the source IP address to the extent IP is used to communicate the second data. In other examples, device 100 may be configured to send the second data received from remote computing device 104 directly to TEE 106 instead of using GEE 108 to forward the second data to TEE 106.

TEE 106 of device 100 receives (424) the second data generated by remote computing device 104 that was forwarded to TEE 106 by GEE 108 for processing. In some examples, TEE 106 may also receive a description of the operation remote computing device 104 wants performed by TEE 106. Here, device 100 processes the information received from remote computing device 104 within TEE 106 using processor 102.

Referring now to FIG. 4B (continuing from the point marked as "A" in FIG. 4A), TEE 106 validates (426) the second data to verify that remote computing device 104 generated the second data. In some examples, verifying that remote computing device 104 generated the second data serves to authenticate remote computing device 104 (e.g., serves to determine that remote computing device 104 is a trustworthy source).

In examples where the second data includes a cryptographic signature of the first data, TEE 106 decrypts the second data with a cryptographic key resulting in a decrypted hash value corresponding to the first data. TEE 106 may then compare this hash value to a hash value of the first data calculated by TEE 106. In such examples, if the decrypted hash value matches the calculated hash value, TEE 106 validates the second data. For example, if the first data was cryptographically signed (e.g., digitally signed) using an asymmetric cryptosystem, the first data may have been signed resulting in second data (e.g., a hash value corresponding to the first data based on a hashing algorithm) being generated followed by the second data being encrypted using a public key meaning that at action 426 the second data is decrypted using a private key corresponding to the public key. As another example, if the first data was cryptographically signed (e.g., digitally signed) using an asymmetric cryptosystem, the first data may have been signed resulting in second data (e.g., a hash value corresponding to the first data based on a hashing algorithm) being generated followed by the second data being encrypted using a private key meaning that at action 426 the second data is decrypted using a public key corresponding to the private key.

As yet another example, if the first data was cryptographically signed (e.g., digitally signed) using a symmetric cryptosystem, the first data may have been signed resulting in second data (e.g., a hash value corresponding to the first data based on a hashing algorithm) being generated followed by the second data being encrypted using a cryptographic key meaning that at action 426 the second data is decrypted using the same cryptographic key. Successful decryption of the second data by TEE 106 may serve to verify that remote computing device 104 generated the second data or otherwise verify the authenticity of the message or sender. Likewise, if the second data includes a password or other value other than a cryptographic signature, validation of the second data may occur when TEE 106 determines that the password or value is acceptable or otherwise correct. In yet other examples, the validation (e.g., decryption) of the second data results in third data being derived with the third data including, for example, a validation or authentication result.

In some examples, additional validation or authentication may be incorporated into the process providing another hurdle for a would-be attacker. For example, user authentication may be incorporated into the process so that TEE 106 may require that both the remote computing device 104 and an authorized user of device 100 authorize usage of a secret. TEE 106 may be configured to perform before, after, or in parallel user authentication via a user authentication protocol, such as a password-based protocol or a biometric protocol (e.g., fingerprint scan or retina scan).

Responsive to successfully verifying remote computing device 104 generated the second data ("YES" branch of 428), TEE 106 unlocks (432) or otherwise rendering accessible for use or processing of a secret by TEE 106. In some examples, the secret may be a cryptographic key, which may be part of an asymmetric or symmetric cryptosystem. In other examples, the secret may be information that is not a cryptographic key. Whether the secret is a cryptographic key or not, the secret may only be accessible to processes executing in TEE 106 of processor 102. TEE 106 may then perform (434) an operation using the unlocked secret. This operation (or operations) may only be able to be performed in TEE 106 of processor 102. In some examples, the operation performed is a cryptographic operation such as an encryption or decryption operation using the unlocked secret. In these examples, using the unlocked secret may refer to the unlocked secret (or plainly, secret) being a cryptographic key that is used to encrypt or decrypt data. Also in these examples, using the unlocked secret may refer to the unlocked secret being information (i.e., data) on which encryption or decryption is performed. The operation performed at action 434 may be an operation corresponding to a description of an operation received by device 100 that was transmitted by remote computing device 104. Otherwise stated, the operation performed at action 434 may be an operation that remote computing device 104 requested be performed by device 100.

Responsive to TEE 106 being unable to successfully verify remote computing device 104 generated the second data ("NO" branch of 428), TEE 106 may refrain (430) from performing the requested operation. For example, TEE 106 may not unlock or not render accessible for use or processing of a secret. As another example, TEE 106 may refrain from performing the requested operation at action 430 because the device or process from which the operation was requested was deemed untrustworthy, not remote computing device 104, or not a trusted device.

Figure 5A:
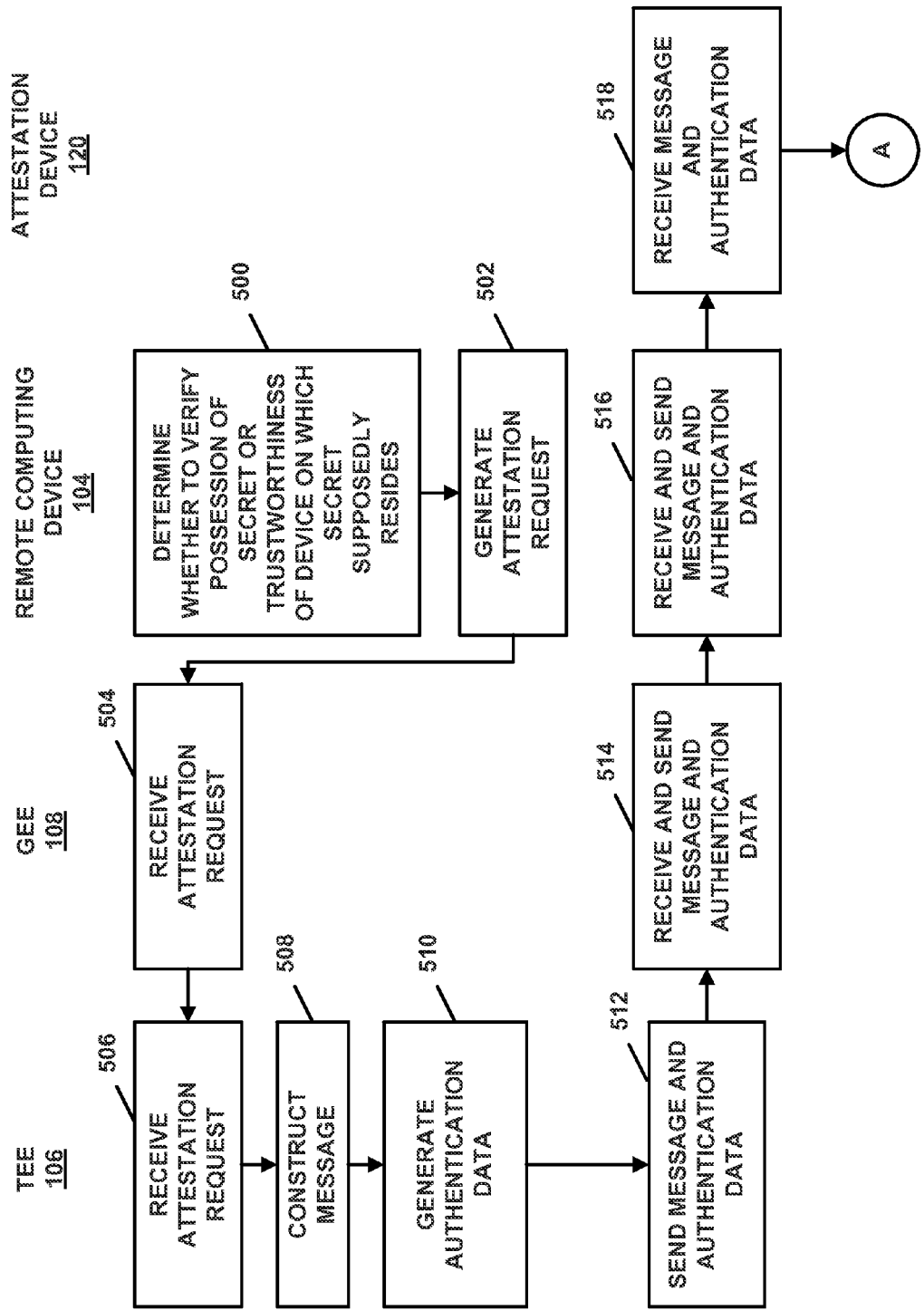
FIG. 5A is a flowchart illustrating an example operation of certain aspects of the computing environment shown in FIG. 1, in accordance with one or more techniques of this disclosure.
Figure 5B:
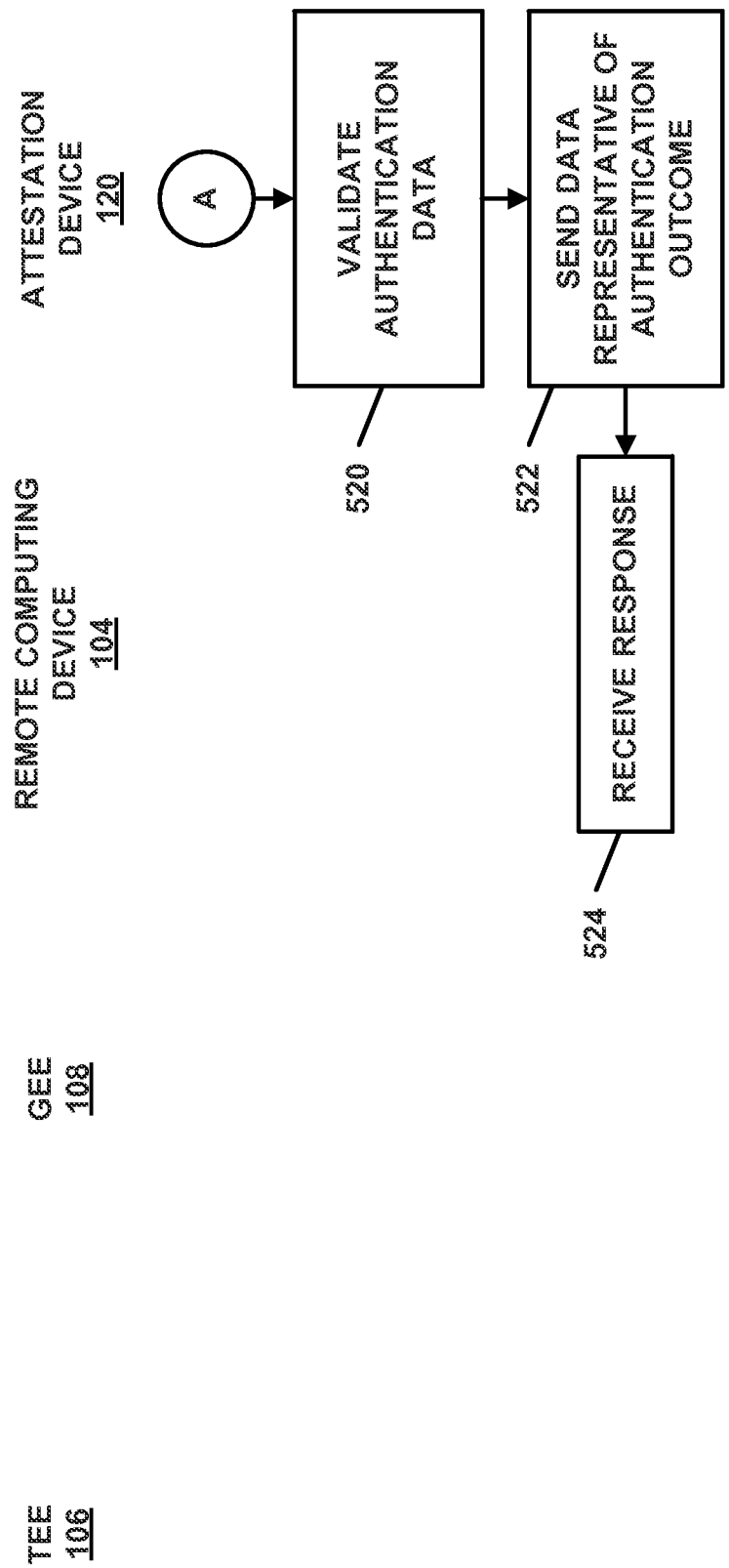
FIG. 5B is a flowchart illustrating a continuation of the example operation depicted in FIG. 5A, in accordance with one or more techniques of this disclosure.

FIGS. 5A-5B constitute a flowchart illustrating an example operation of certain aspects of the computing environment shown in FIG. 1, in accordance with one or more techniques of this disclosure. Processes shown under the TEE 106 label constitute TEE processes 110 and processes shown under the GEE 108 label constitute non-TEE processes 118. The example operation shown in FIGS. 5A-5B may be combined with the example operation shown in FIGS. 4A-4B. Similarly, the example operation shown in FIG. 2 may be combined with the example operation shown in FIG. 3.

Referring to FIG. 5A, remote computing device 104 may determine (500) whether to verify that a secret supposedly stored in memory on device 100 that remote computing device has requested or will request be unlocked (e.g., via an operation request sent to the device 100) is in fact stored in memory on device 100. In another example, remote computing device 104 may determine whether to verify that a device (e.g., device 100), or environment (e.g., TEE 106) remote computing device 104 is ultimately in communication with, is a trustworthy device or environment. Upon making either of these determinations, remote computing device 104 may send (502) an attestation request to device 100.

GEE 108 of device 100 is shown as receiving (504) the attestation request issued by remote computing device 104. Here, GEE 108 may analyze the attestation request and determine the attestation request should be forwarded to TEE 106 of device 100. For example, GEE 108 may analyze data in a packet header associated with the transmission of the attestation request to determine that the request came from remote computing device 104. As one example, a packet header may include the source IP address to the extent IP is used to communicate the attestation request. In other examples, device 100 may be configured to send the attestation request received from remote computing device 104 directly to TEE 106 instead of using GEE 108 to forward the request to TEE 106.

TEE 106 of device 100 receives (506) the attestation request issued by remote computing device 104 that was forwarded to TEE 106 by GEE 108 for processing. In response to receiving the attestation request, TEE 106 constructs (508) or otherwise generates a message containing public data associated with a secret that remote computing device 104 seeks to verify is in fact available on device 100. For example, the public data may be a public key corresponding to a private key where the secret is the private key. In addition to the message containing public data associated with a secret sought to be attested, the message may also be constructed to contain a description of the authorization required to use the secret. The message may include data indicative of whether the secret is stored in memory accessible to device 100 (or TEE 106). TEE 106 generates (510) authentication data for the constructed message by, for example, cryptographically signing the message with the device-specific secret. In examples involving a cryptographic signage of data, the resultant authentication data may be referred to as a cryptographic signature. For example, the authentication data may be an encrypted hash value corresponding to the message data based on a hashing algorithm (e.g., the authentication data may be a cryptographic signature). Otherwise stated, to generate the authentication data, remote computing device 100 may calculate a hash value of the message using a hashing algorithm. The device 100 may then encrypt the hash value corresponding to the message to generate the authentication data (e.g., an encrypted hash value corresponding to the message according to some examples).

TEE 106 sends (512) or otherwise transmits the message and authentication data to GEE 108 that in turn causes the message and authentication data to be sent (514) by device 100 to remote computing device 104. As disclosed herein, where a process, element, or entity is described as performing an action or capable of performing an action, it is understood that such a process, element, or entity may cause the device (or a component relating thereto) with which the process, element, or entity is associated to perform the action. As one example, reference to TEE 106 sending data to remote computing device 104 is also understood to mean that TEE 106 causes device 100 to send data to remote computing device 104.

Remote computing device 104 receives (516) the message and authentication data from device 100 and sends or otherwise transmits the message and authentication data to attestation device 120. Attestation device receives (518) the message and authentication data. In other examples, TEE 106 may cause the message and authentication data to be transmitted by device 100 to remote computing device 104 without involving the GEE 108. In yet other examples, TEE 106 may cause the message and authentication data to be transmitted by device 100 to attestation device 120 without involving GEE 108 or remote computing device 104.

Referring now to FIG. 5B (continuing from the point marked "A" in FIG. 5A), attestation device 120 uses its copy of the device-specific secret to validate (520) the authentication data to verify that device 100 (or TEE 106) generated the authentication data. In some examples, verifying that device 100 (or TEE 106) generated the authentication data serves to authenticate device 100 (or TEE 106) as, for example, a trustworthy source or serves to authenticate the message with which the authentication data is associated (e.g., came from a trustworthy source such as a trustworthy device or trustworthy TEE). As one example, attestation device 120 may use it copy of the device-specific secret to decrypt the authentication data resulting in a decrypted hash value corresponding to the message. Attestation device 120 then compare this hash value to a hash value of the message calculated by attestation device 120. In such examples, if the decrypted hash value matches the calculated hash value, attestation device 120 validates the authentication data.

Depending on the outcome of the validation process at action 520, attestation device 120 sends (522) or otherwise transmits data to remote computing device 104 representative any validation result(s). For example, a validation result may indicate a positive or negative validation. A positive validation may indicate that the authentication data and therefore the message associated therewith (e.g., the message sent along with the authentication data) were generated by device 100 (or TEE 106). A negative authentication may indicate the opposite is true. Remote computing device 104 receives (524) data representative of the validation process and based on that data, knows whether device 100 (or TEE 106) generated the authentication data. Additionally, a positive authentication may indicate that TEE 106 (or device 100) has in its possession (e.g., on memory accessible to the device) the secret and, in some instances, any restrictions that may be enforced on the access or usage of the secret. A negative authentication may indicate the opposite is true.

Figure 6:
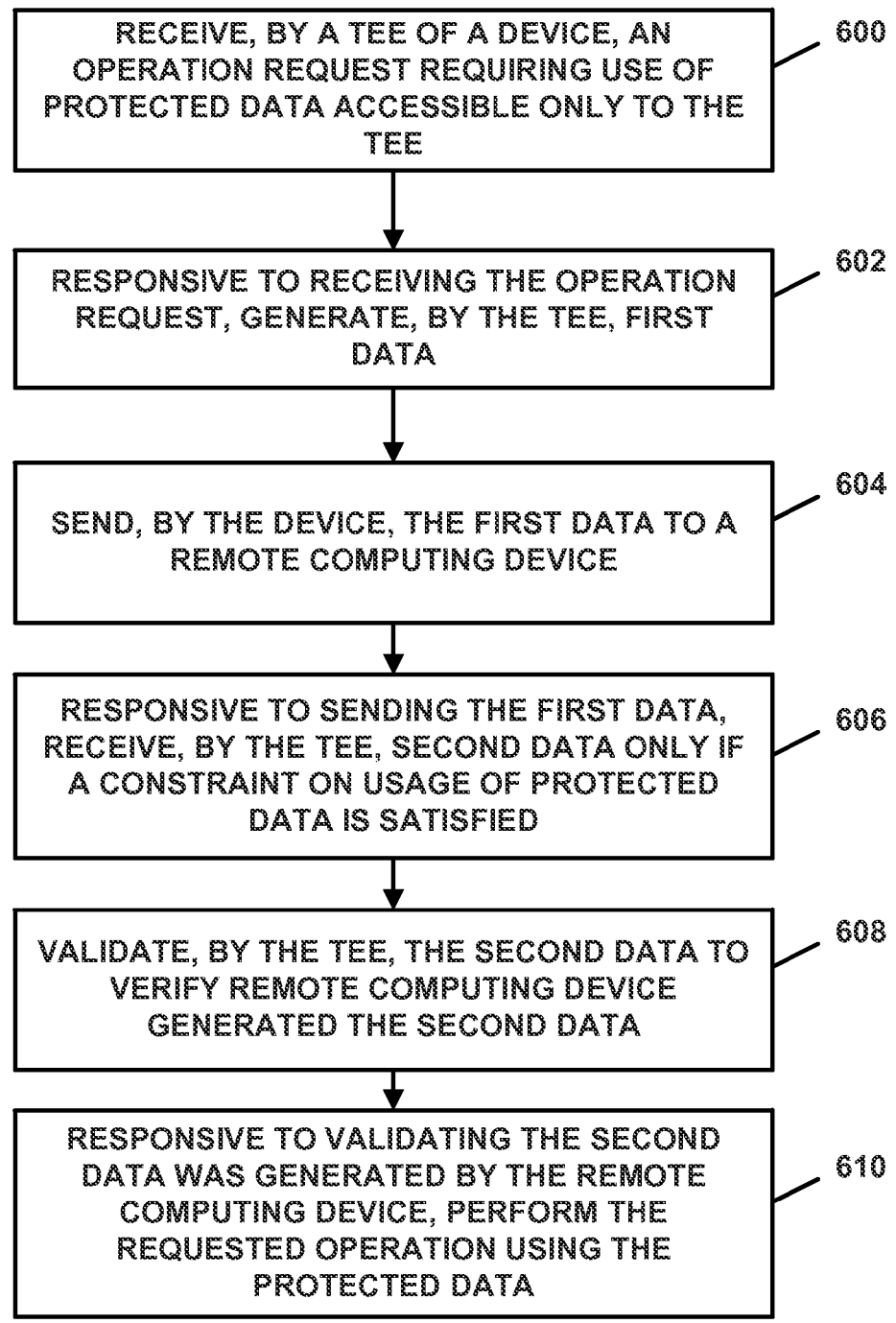
FIG. 6 is a flowchart illustrating an example operation of certain aspects of the computing environment shown in FIG. 1, in accordance with one or more techniques of this disclosure.

FIG. 6 is a flowchart illustrating an example operation of certain aspects of the computing environment shown in FIG. 1, in accordance with one or more techniques of this disclosure. In the example shown in FIG. 6, TEE 106 of device 100 receives (600) an operation request requiring use of protected data, such as a secret, accessible only to TEE 106. Responsive to receiving the operation request, TEE 106 generates (602) first data. The first data may be the same as or different from the first data described with reference to FIGS. 2 and 4A-4B, or as otherwise described in this disclosure. Device 100 (or TEE 106) sends (604) the first data to remote computing device 104. Responsive to sending the first data, TEE 106 receives (606) second data only if a constraint on usage of the protected data is satisfied. Second data may be the same as or different from the second data described with reference to FIGS. 2 and 4A-4B, or as otherwise described in this disclosure. TEE 106 validates (608) the second data to verify remote computing device 104 generated the second data. Responsive to validating the second data was generated by remote computing device 104, TEE 106 performs (610) the requested operation using the protected data.

Figure 7:
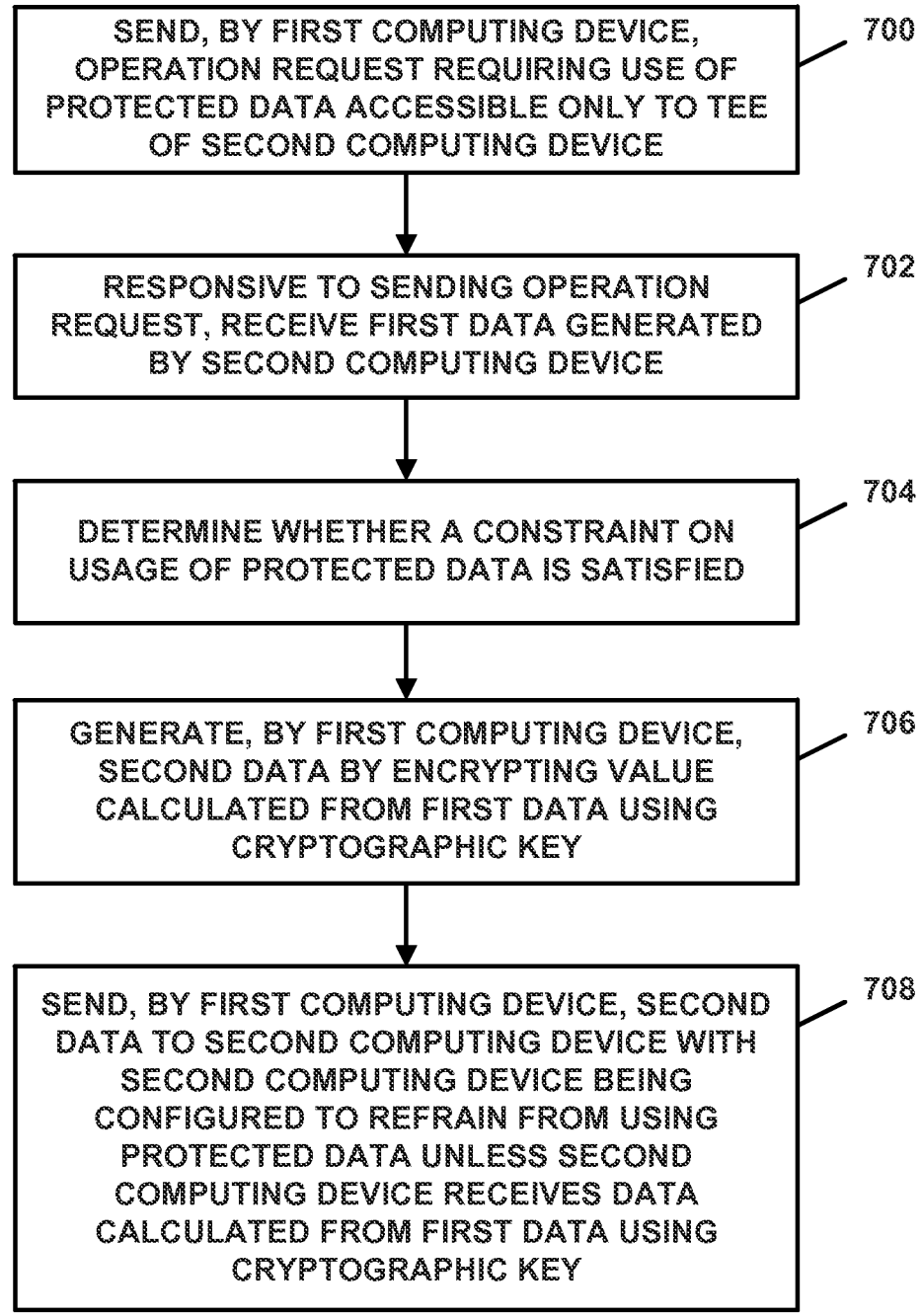
FIG. 7 is a flowchart illustrating an example operation of certain aspects of the computing environment shown in FIG. 1, in accordance with one or more techniques of this disclosure.

FIG. 7 is a flowchart illustrating an example operation of certain aspects of the computing environment shown in FIG. 1, in accordance with one or more techniques of this disclosure. In the example shown in FIG. 7, a first computing device (e.g., remote computing device 104) sends (700) an operation request requiring use of protected data, such as a secret, accessible only to TEE 106 of a second computing device (e.g., device 100) to the second computing device. Responsive to sending the operation request, the first computing device receives (702) first data generated by the second computing device. The first data may be the same as or different from the first data described with reference to FIGS. 2 and 4A-4B, or as otherwise described in this disclosure. The first computing device determines (704) whether a constraint on usage of the protected data is satisfied. Responsive to determining the constraint on usage of the protected data is satisfied, the first computing device generates (706) second data by encrypting a value, such as a hash value, calculated from the first data using a cryptographic key. Second data may be the same as or different from the second data described with reference to FIGS. 2 and 4A-B, or as otherwise described in this disclosure. The first computing device sends (708) the second data to the second computing device, which is configured to refrain from using the protected data unless the second computing device receives data calculated from the first data using the cryptographic key.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or may include communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions or operations may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims. A non-exhaustive list of some of these examples is provided below.

Example 1

A method comprising: receiving, by a TEE implemented by a computing device, an operation request requiring use of protected data accessible only to the TEE; responsive to receiving the operation request, generating, by the TEE, first data; sending, by the computing device, the first data to a remote computing device; responsive to sending the first data, receiving, by the TEE, second data only if a constraint on usage of the protected data is satisfied; validating, by the TEE, the second data to verify the remote computing device generated the second data; and responsive to validating the second data was generated by the remote computing device, performing an operation indicated by the operation request using the protected data.

Example 2

The method of example 1, wherein validating the second data comprises: using, by the TEE, a cryptographic key to decrypt the second data, wherein the second data comprises a first hash value of the first data generated by the remote computing device; performing, by the TEE, a hashing algorithm on the first data to generate a second hash value of the first data; and determining, by the TEE, the second data is verified when the first hash value matches the second hash value.

Example 3

The method of example 1, wherein the operation request is received from a process executing outside of the TEE.

Example 4

The method of example 1, wherein the protected data is a private cryptographic key, the method further comprising: receiving, by the TEE, an attestation request requesting the TEE to attest whether the protected data is stored in memory accessible to the TEE; responsive to the attestation request, generating, by the TEE, encrypted authentication data using the private cryptographic key; and sending, by the computing device, a message comprising the encrypted authentication data.

Example 5

The method of example 4, wherein: the message further comprises a public cryptographic key corresponding to the private cryptographic key and a description of authentication requirements of the protected data, and the encrypted authentication data comprises a hash value based on the public cryptographic key and the description.

Example 6

The method of example 1, further comprising: responsive to the TEE receiving the operation request, requesting, by the TEE, input of a user authentication credential, and receiving, by the TEE, data representative of the user authentication credential, wherein the TEE refrains from performing any cryptographic operation using the protected data unless the TEE determines the data representative of the user authentication credential is valid.

Example 7

The method of example 1, wherein the constraint is based on a number of requests to use the protected data or a rate of requests to use the protected data.

Example 8

A method comprising: sending, by a first computing device, an operation request requiring use of protected data accessible only to a TEE implemented by a second computing device remote to the first computing device; responsive to sending the operation request, receiving, by the first computing device, first data generated by the second computing device; determining, by the first computing device, whether a constraint on usage of the protected data is satisfied; responsive to determining the constraint on usage of the protected data is satisfied, generating, by the first computing device, second data by encrypting a value calculated from the first data using a cryptographic key; and sending, by the first computing device, the second data to the second computing device, wherein the second computing device is configured to refrain from using the protected data unless the second computing device receives data calculated from the first data using the cryptographic key.

Example 9

The method of example 8, wherein the cryptographic key corresponds to an asymmetric cryptosystem or a symmetric cryptosystem.

Example 10

The method of example 9, wherein the cryptographic key is a private cryptographic key with a corresponding public cryptographic key usable to decrypt the second data.

Example 11

The method of example 8, wherein the constraint is based on a number of requests to use the protected data or a rate of requests to use the protected data.

Example 12

The method of example 8, further comprising sending, by the first computing device, a description of the operation indicated by the operation request to the second computing device.

Example 13

The method of example 8, further comprising: sending, by the first computing device, an attestation request requesting the TEE to attest whether the protected data is stored in memory accessible to the TEE; receiving, by the first computing device, an attestation response in response to the attestation request, the attestation response comprising encrypted data; sending, by the first computing device, the encrypted data to a third computing device; and receiving, by the first computing device, from the third computing device, in response to sending the encrypted data to the third computing device, an indication of whether the TEE possesses the protected data.

Example 14

The method of example 13, wherein: the protected data comprises a private cryptographic key, the first computing device receives, in response to sending the encrypted data to the third computing device, an indication the TEE possess the private cryptographic key when the encrypted data was encrypted using the private cryptographic key.

Example 15

The method of example 14, wherein the attestation response further comprises a public cryptographic key corresponding to the private cryptographic key and a description of authorization required to use the protected data, the method further comprising: sending, by the first computing device, the public cryptographic key and the description to the third computing device.

Example 16

A computing device, comprising: one or more processors configured to: send an operation request requiring use of protected data accessible only to a TEE implemented by a remote computing device; receive, in response to sending the operation request, first data generated by the remote computing device; determine whether a constraint on usage of the protected data is satisfied; responsive to determining the constraint on usage of the protected data is satisfied: generate second data by encrypting a hash value calculated from the first data using a cryptographic key; and send the second data to the second computing device; and responsive to determining the constraint on the usage of the protected data is not satisfied, refrain from sending the second data to the second computing device, wherein the second computing device is configured to refrain from using the protected data unless the second computing device receives data calculated from the first data using the cryptographic key.

Example 17

The computing device of example 16, wherein the cryptographic key is a private cryptographic key with a corresponding public cryptographic key usable to decrypt the second data.

Example 18

The computing device of example 16, wherein the constraint is based on a number of requests to use the protected data or a rate of requests to use the protected data.

Example 19

The computing device of example 16, wherein the one or more processors are configured to: send an attestation request requesting the TEE to attest whether the protected data is stored in memory accessible to the TEE; responsive to sending the attestation request, receiving a message generated by the remote computing device, the message comprising authentication data encrypted using a private cryptographic key.

Example 20

The computing device of example 19, wherein the message further comprises a public cryptographic key corresponding to the private cryptographic key constituting the protected data and a description of authentication requirements of the protected data, and wherein the authentication data comprises a hash value based on the public cryptographic key and the description.

What is claimed is:

1. A method comprising:
    receiving, by a trusted execution environment implemented by a computing device, an attestation request requesting the trusted execution environment to attest whether protected data, comprising a private cryptographic key and accessible only to the trusted execution environment, is stored in memory accessible to the trusted execution environment;
    responsive to the attestation request, generating, by the trusted execution environment, encrypted authentication data using the private cryptographic key;
    responsive to sending a message comprising the encrypted authentication data, receiving, by the trusted execution environment, an operation request requiring use of the protected data;
    responsive to receiving the operation request, generating, by the trusted execution environment, first data;
    sending, by the computing device, the first data to a remote computing device;
    responsive to sending the first data, receiving, by the trusted execution environment, second data only if a constraint on usage of the protected data is satisfied;
    validating, by the trusted execution environment, the second data to verify the remote computing device generated the second data; and
    responsive to validating the second data was generated by the remote computing device, performing an operation indicated by the operation request using the protected data.

2. The method of claim 1, wherein validating the second data comprises:
    using, by the trusted execution environment, the private cryptographic key to decrypt the second data, wherein the second data comprises a first hash value of the first data generated by the remote computing device;
    performing, by the trusted execution environment, a hashing algorithm on the first data to generate a second hash value of the first data; and
    determining, by the trusted execution environment, the second data is verified when the first hash value matches the second hash value.

3. The method of claim 1, wherein the operation request is received from a process executing outside of the trusted execution environment.

4. The method of claim 1, wherein:
    the message further comprises a public cryptographic key corresponding to the private cryptographic key and a description of authentication requirements of the protected data, and
    the encrypted authentication data comprises a hash value based on the public cryptographic key and the description.

5. The method of claim 1, further comprising:
    responsive to the trusted execution environment receiving the operation request, requesting, by the trusted execution environment, input of a user authentication credential, and
    receiving, by the trusted execution environment, data representative of the user authentication credential, wherein the trusted execution environment refrains from performing any cryptographic operation using the protected data unless the trusted execution environment determines the data representative of the user authentication credential is valid.

6. The method of claim 1, wherein the constraint is based on a number of requests to use the protected data or a rate of requests to use the protected data.

7. A method comprising:
    sending, by the first computing device, an attestation request requesting a trusted execution environment of a second computing device remote to the first computing device to attest whether protected data, accessible only to the trusted execution environment, is stored in memory accessible to the trusted execution environment;
    receiving, by the first computing device, an attestation response in response to the attestation request, the attestation response comprising encrypted data;
    sending, by the first computing device, the encrypted data to a third computing device;
    receiving, by the first computing device, from the third computing device, in response to sending the encrypted data to the third computing device, an indication of whether the trusted execution environment possesses the protected data;
    responsive to receiving an indication that the trusted execution environment possesses the protected data, sending, by the first computing device, an operation request requiring use of the protected data;
    responsive to sending the operation request, receiving, by the first computing device, first data generated by the second computing device;
    determining, by the first computing device, whether a constraint on usage of the protected data is satisfied;
    responsive to determining the constraint on usage of the protected data is satisfied, generating, by the first computing device, second data by encrypting a value calculated from the first data using a private cryptographic key; and
    sending, by the first computing device, the second data to the second computing device, wherein the second computing device is configured to refrain from using the protected data unless the second computing device receives data calculated from the first data using the private cryptographic key.

8. The method of claim 7, wherein the private cryptographic key corresponds to an asymmetric cryptosystem or a symmetric cryptosystem.

9. The method of claim 8, wherein the private cryptographic key is associated with a corresponding public cryptographic key usable to decrypt the second data.

10. The method of claim 7, wherein the constraint is based on a number of requests to use the protected data or a rate of requests to use the protected data.

11. The method of claim 7, further comprising sending, by the first computing device, a description of the operation indicated by the operation request to the second computing device.

12. The method of claim 7, wherein:
the protected data comprises the private cryptographic key,
the first computing device receives, in response to sending the encrypted data to the third computing device, an indication the trusted execution environment possess the private cryptographic key when the encrypted data was encrypted using the private cryptographic key.

13. The method of claim 12, wherein the attestation response further comprises a public cryptographic key corresponding to the private cryptographic key and a description of authorization required to use the protected data, the method further comprising:
sending, by the first computing device, the public cryptographic key and the description to the third computing device.

14. A computing device, comprising:
one or more processors; and
a memory comprising instructions that when executed, cause the one or more processors to:
send an attestation request requesting a trusted execution environment of a remote computing device to attest whether protected data accessible only to the trusted execution environment is stored in memory accessible to the trusted execution environment;
responsive to sending the attestation request, receiving a message generated by the remote computing device, the message comprising authentication data encrypted using a private cryptographic key;
responsive to receiving the message, send an operation request requiring use of the protected data;
receive, in response to sending the operation request, first data generated by the remote computing device;
determine whether a constraint on usage of the protected data is satisfied;
responsive to determining the constraint on usage of the protected data is satisfied:
generate second data by encrypting a hash value calculated from the first data using the private cryptographic key; and
send the second data to the second computing device; and
responsive to determining the constraint on the usage of the protected data is not satisfied, refrain from sending the second data to the second computing device, wherein the second computing device is configured to refrain from using the protected data unless the second computing device receives data calculated from the first data using the private cryptographic key.

15. The computing device of claim 14, wherein the private cryptographic key is associated with a corresponding public cryptographic key usable to decrypt the second data.

16. The computing device of claim 14, wherein the constraint is based on a number of requests to use the protected data or a rate of requests to use the protected data.

17. The computing device of claim 14, wherein the message further comprises a public cryptographic key corresponding to the private cryptographic key constituting the protected data and a description of authentication requirements of the protected data, and wherein the authentication data comprises a hash value based on the public cryptographic key and the description.

* * * * *